United States Patent [19]
Eckstein

[11] Patent Number: 5,324,379
[45] Date of Patent: Jun. 28, 1994

[54] METHOD AND APPARATUS FOR PRODUCING DRIP IRRIGATION CONDUIT

[75] Inventor: Gershon Eckstein, San Diego, Calif.

[73] Assignee: Drip Irrigation Systems, Ltd., San Diego, Calif.

[21] Appl. No.: 9,834

[22] Filed: Jan. 27, 1993

[51] Int. Cl.[5] .............................................. B29C 47/02
[52] U.S. Cl. .............................. 156/244.13; 156/500; 239/542
[58] Field of Search ............................ 156/244.13, 500; 239/542

[56] References Cited

U.S. PATENT DOCUMENTS

| | | |
|---|---|---|
| 3,981,452 | 9/1976 | Eckstein . |
| 4,307,841 | 12/1981 | Mehoudar et al. . |
| 4,473,525 | 9/1984 | Drori . |
| 4,726,520 | 2/1988 | Brown et al. . |
| 4,817,875 | 4/1989 | Karmeli et al. . |
| 4,859,264 | 8/1989 | Buluschek . |
| 5,022,940 | 6/1991 | Mehoudar . |
| 5,111,995 | 5/1992 | Dumitrascu et al. . |
| 5,123,984 | 6/1992 | Allport et al. . |
| 5,163,622 | 11/1992 | Cohen ................................. 239/542 |

*Primary Examiner*—Caleb Weston
*Attorney, Agent, or Firm*—Edward B. Anderson

[57] ABSTRACT

A plurality of emitters are attached serially along a continuous length of thread at spaced-apart locations. A first of the emitters is attached to a conduit, whereby subsequent emitters are drawn into the conduit as the conduit is drawn from the extrusion head. Each subsequent emitter is supported as it is drawn into and attached to the conduit. The emitters may be fixedly or releasably attached to the thread. If releasably attached, the thread may be detached from each emitter after the emitter is attached to the conduit. In this case, the thread may be formed as a loop that travels around a continuous path.

36 Claims, 5 Drawing Sheets

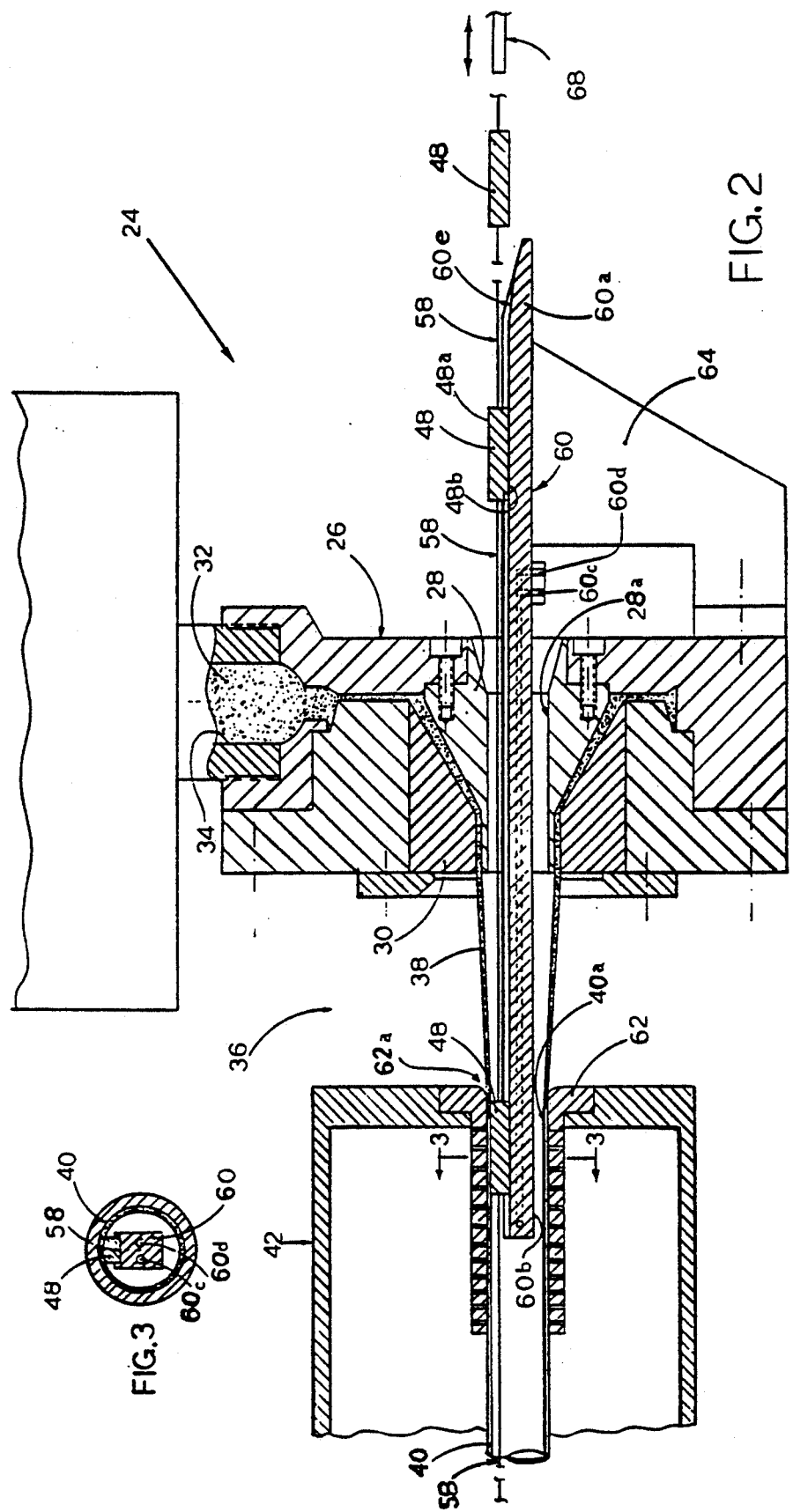

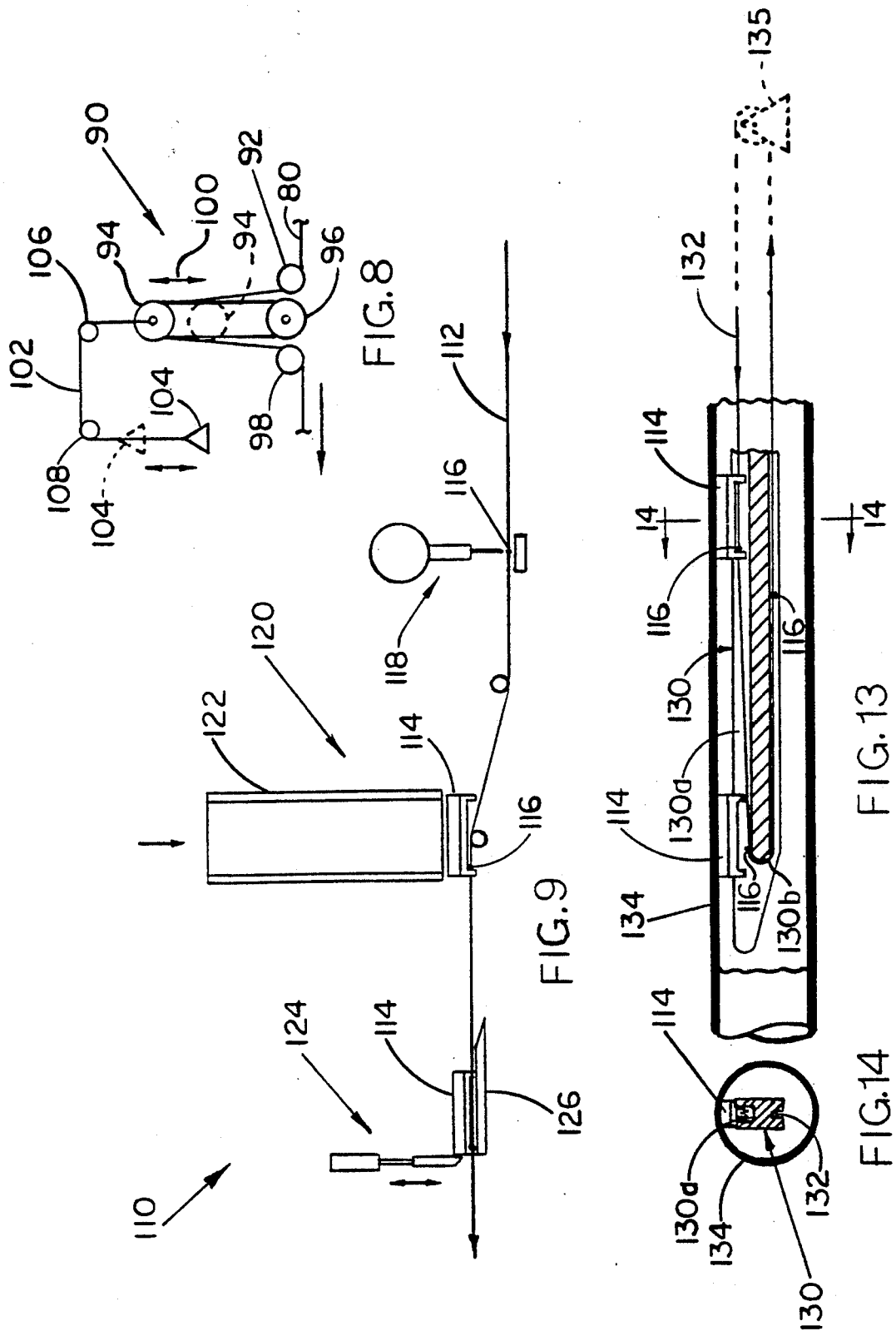

METHOD AND APPARATUS FOR PRODUCING DRIP IRRIGATION CONDUIT

BACKGROUND OF THE INVENTION

1. Field of the Invention

This invention relates to the production of drip irrigation lines, and particularly to the production of such drip lines in which emitters are fixed in a conduit at spaced-apart locations.

2. Related Art

U.S. Pat. No. 3,981,452 of Eckstein describes a method of manufacturing a continuous drip irrigation line by inserting drip emitters into a continuous and uninterrupted conduit. These emitters are cylinders having an outer surface structured to cooperate with the enclosing conduit to form pressure-reducing passageways. This method was further extended by Mehoudar as is disclosed in U.S. Pat. No. 5,022,940 to provide for the insertion of emitters that take up less than the full periphery of the conduit. The emitters are inserted into the extruded conduit by means of a mechanical pusher that is electrically or pneumatically driven and electronically controlled. The pusher pushes each emitter through the cross head and then retreats.

The insertion speed of the pusher must be controlled so that as the emitter reaches the molten conduit coming out of the cross head, it has the same speed as the conduit. This prevents breaking or collapsing of the conduit and allows heat welding of the emitter to the conduit. Further, the pusher has to be withdrawn from the conduit to its start position before the next emitter can be inserted in the conduit. This reciprocating motion is a time consuming process and is limited to the mechanical capabilities of the pusher and associated controller and emitter feed mechanism.

SUMMARY OF THE INVENTION

The present invention provides an improved method and apparatus for making continuous and uninterrupted drip irrigation lines without the limitations of the prior art as described above. In particular, it provides for the manufacture of a drip irrigation line without the continuous use of a pusher.

These features are provided generally in the method of the present invention by attaching a first emitter to an elongate flexible element, and continuously extruding an irrigation conduit from an extrusion head. The conduit is drawn from the extrusion head, and the flexible element is drawn into the conduit. The emitter is thereby drawn into and attached to the conduit.

The preferred method of practicing the invention includes the step of attaching a plurality of emitters serially along a continuous length of thread at spaced-apart locations. A first of the emitters is attached to the conduit, whereby subsequent emitters are drawn into the conduit as the conduit is drawn from the extrusion head. Each subsequent emitter is supported as it is drawn into and attached to the conduit.

In one aspect of the invention, the emitters are fixedly attached to the thread and the thread remains in the conduit. Alternatively, the thread is releasably attached to the conduit, and the thread is detached from each emitter after the emitter is attached to the conduit. The thread is formed as a loop extending around a continuous path.

Thus, there is no mechanical reciprocating mechanism required to insert the emitters. They are drawn into the conduit by the prior emitter that is attached to the conduit. There is thereby conceptually no limitation to the speed of the drip line manufacturing process, other than those inherent in the actual conduit extrusion process, in the feeding of the string of emitters into the conduit, and if applicable, to attach conduits to the connecting thread or threads.

These and other features and advantages of the present invention will be apparent from the following detailed description of the preferred embodiment of the invention, described for purposes of illustration but not limitation, and as illustrated in the accompanying drawings.

BRIEF DESCRIPTION OF THE DRAWINGS

FIG. 2 is an enlarged longitudinally sectioned view of a portion of the assembly of FIG. 1.

FIG. 3 is a further enlarged cross section taken along line 3—3 in FIG. 2.

FIG. 8 is a schematic view of a take-up for use in an installation combining the apparatus of FIG. 4 in the system of FIG. 1.

FIG. 9 is a schematic view of an alternative apparatus for attaching emitters to a thread according to the invention for use in the installation of FIG. 1.

FIG. 13 is a partial longitudinal cross section of a portion of an emitter support in an installation similar to the installation of FIG. 1 in which a continuous loop of thread is used to draw emitters into the conduit.

FIG. 14 is a cross section taken along line 14—14 in FIG. 13.

DETAILED DESCRIPTION OF THE PREFERRED EMBODIMENT

Figure 1:
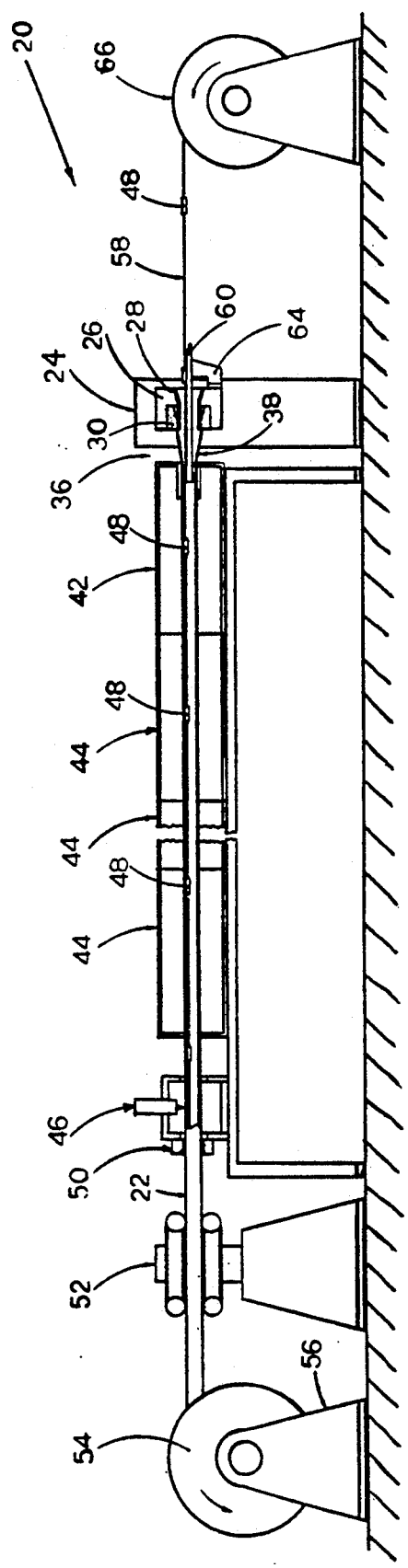
FIG. 1 is a schematic view of a drip irrigation line extrusion installation made according to the invention.

Referring initially to FIGS. 1-3, a production installation, shown generally at 20, is for making a continuous extruded drip irrigation line 22 according to the invention. Installation 20 includes an extruder 24 having an extrusion cross head 26. The cross head includes a mandrel 28 having a longitudinal bore 28a, and a die 30. Molten conduit material 32, coming from a distributing chamber 34 in the cross head, emerges in an intermediate region 36 from between mandrel 28 and die 30. The emerging molten material begins cooling in intermediate region 36, forming a semi-molten conical shape at 38 that is drawn down in region 36 to a reduced-diameter conduit 40 in a calibrating and cooling trough 42.

Calibrating and cooling trough 42 and a plurality of cooling troughs, such as trough 44, are located downstream from and spaced from the extruder cross head. Downstream of cooling troughs 44 is a conduit perforating device 46 for perforating conduit 40 at locations corresponding to the positions of emitters, such as emitter 48 positioned in and attached to conduit 40 at spaced-apart locations. The perforations provide orifices that function as water outlets from the emitters. A detector 50 mounted on the perforating device ensures that the conduit is perforated. Following device 46 is a caterpillar-type take-off 52 for drawing completed drip line 22 from the calibrating and cooling troughs, after which it is coiled on a spool 54 by a coiler unit 56.

Emitters 48 are connected to a continuous thread 58, also referred to as a flexible element and preferably made of nylon or any other suitable material, either as a single filament or a plurality of filaments, that is able to withstand the temperatures of the cross head without deterioration and which is unlikely to deteriorate in the drip line during use. The formation of the string of emitters is described below with reference to FIGS. 4–16.

An elongate emitter support 60 extends from an upstream end 60a positioned out from cross head 26, through longitudinal bore 28a and intermediate region 36, and to a downstream end 60b in calibration cylinder 62 of calibration and cooling trough 42. Support 60 is water cooled by two channels 60c and 60d that are connected at support end 60b. Upstream end 60a of the support itself supported by a brace 64 attached to cross head 26. Brace 64 is preferably adjustable vertically for aligning the position of an emitter carried on the support so that the upper surface 48a of each successive emitter contacts the upper inner surface 40a of the conduit while the conduit is in a semi-molten state. Each emitter 48 preferably contacts conduit 40 near the inlet 62a of the calibration cylinder. The emitter is held against the conduit wall until they are heat welded together, prior to solidification of the conduit. Except for the use of a string of emitters, the structure of installation 20 may be made very similar to that described in previously cited U.S. Pat. No. 5,022,940.

As shown particularly in FIG. 1, the emitters may be attached to the thread prior to formation of drip line 22. In this case, the string of emitters is wound on a spool 66. Alternatively, and as will be described in further detail below, the thread may be attached to the emitters as the associated drip line is being formed.

According to the method of the invention, the first emitter attached to thread 58 is inserted into conduit 40 on support 60, manually or mechanically, such as by using an elongated rod 68 as is described in U.S. Pat. No. 5,022,940. The conduit is extruded at a first reduced rate during this initial stage so that the first emitter can be placed against the conduit without damaging it. The important thing at this stage is that this first emitter be attached to the conduit, so that the thread is thereby anchored relative to the conduit. The drawing of the conduit out of the calibration trough by take-off 52 thereafter draws the string of emitters into the conduit, so that no mechanical insertion of the emitters is thereafter required.

The thread may be anchored initially in any appropriate way, such as by a simple plug that is attached to the string of emitters. Each emitter, as it is attached to the conduit, then functions as an anchor for the next succeeding emitter. After the drip line is formed with emitters attached to the conduit, the plug end of the drip line can then simply be severed from the usable part of the line.

Once the initial anchor, regardless of what form it is, is attached to the conduit, the extrusion of the conduit and feeding of the string of emitters are then accelerated to a higher velocity limited only by limitations in the rate of extruding the conduit and the rate of generating or unravelling the string of emitters. Since the conduit draws the string of emitters into it as the same rate that it travels, the emitters always travel at the same rate as the conduit during the heat welding stage.

Support 60 has an upper surface 60e that conforms with the lower surface 48b of the emitters to guide them into contact with the semi-molten conduit 40 at the inlet 62a of the calibration cylinder. Conduit 40 is supported by the calibration cylinder while the emitter is being heat welded to it.

In another aspect of the present invention, a method and apparatus is provided for attaching emitters to a thread. In the embodiment of FIG. 1, the emitters are fixedly attached to the emitters to form a continuous string that resides in the completed drip line. FIGS. 4–7 illustrate an emitter-threading installation 70 having a plurality of emitter-attaching stations 72. Each station 72 includes a magazine 74 storing a plurality of emitters 76 and an attaching apparatus 78 that attaches an emitter 76 received from magazine 74 to a continuous thread 80. Emitters 76 have an emitter body 86 made conventionally and an subtending ridge 88 that conforms to a corresponding open channel in an emitter support, such as support 60 shown in FIG. 2. Thread 80 is heat welded to the bottom of ridge 88, as shown.

Figure 4:
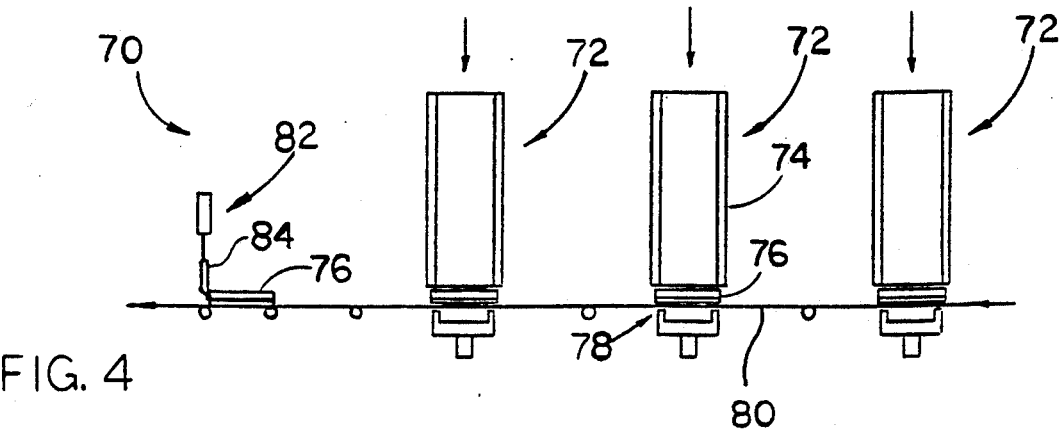
FIG. 4 is a schematic view of apparatus for fixedly attaching emitters to a thread according to the invention for use in the assembly of FIG. 1.
Figure 5:
FIG. 5 is a bottom view of an emitter attached to a thread as provided by the apparatus of FIG. 4.
Figure 6:
FIG. 6 is a side view of the emitter of FIG. 5.
Figure 7:
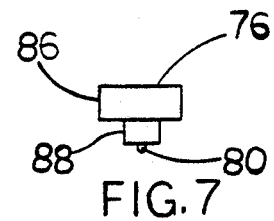
FIG. 7 is an end view of the emitter of FIG. 5.

Three stations 72 are shown in FIG. 4. After each set of three emitters are attached to thread 80, the emitters are drawn away from the threading installation. An emitter detector 82 senses the last of each series of three emitters and stops travel of thread 80. Detector 82 is shown with a retractable mechanical arm 84 that physically contacts the associated emitter. A photodetector or other well known type of detector could also be used. The thread is then held in position while the next three emitters are attached.

The completed string of emitters may be coiled on a take-up spool, such as spool 66 shown in FIG. 1. Alternatively, the emitter string may be fed continuously and directly onto a drip line installation as the emitters are attached to the thread.

Emitter-threading installation 70 requires intermittent movement of thread 80 between attachment periods during which the thread travel is stopped. If a spool of threaded emitters is being prepared prior to formation of a drip line, the movement of take-up and let-out spools can be controlled to provide for the intermittent movement of the thread.

An alternative approach is to use a dancer or take-up, such as take-up 90 shown in FIG. 8. This is an apparatus to take up slack thread, either with or without emitters attached. The thread 80 wraps around a first idler pulley 92, around a movable slack-accommodating pulley 94 and a fixed second idler pulley 96, back around pulley 94, and finally around a third idler pulley 98. The thread feeds in (from the right) to pulley 92 at a variable or intermittent rate. It feeds out (to the left) from pulley 98 at a constant or other rate. The difference between the rates of feeding in and out is accommodated by movement vertically of movable pulley 94, as represented by arrow 100.

Pulley 94 is given a relative constant force upwardly by a line 102, thereby keeping thread 80 relatively constantly taught. This force is applied by a weight 104 acting on line 102 which is carried on idler pulleys 106 and 108. Take-up 90, or an equivalent apparatus, can thus be used to accommodate variations between two operations on a single thread.

A second embodiment of an emitter-threading installation, shown generally at 110, is illustrated in FIGS. 9-14. Installation 110 releasably attaches a thread 112 to emitters 114 by attaching stops, here in the form of knots, such as knot 116 made directly in thread 112. The knots are made by a knotting apparatus 118 that gathers a portion of the continuous run of thread 112 and forms it into a knot using well known techniques.

Figure 10:
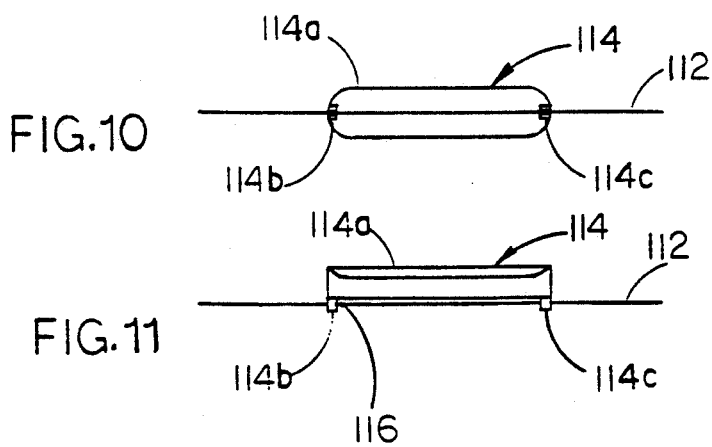
FIG. 10 is a bottom view of an emitter attached to a thread as provided by the apparatus of FIG. 9.
Figure 11:
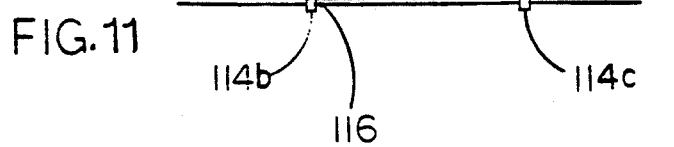
FIG. 11 is a side view of the emitter of FIG. 10.
Figure 12:
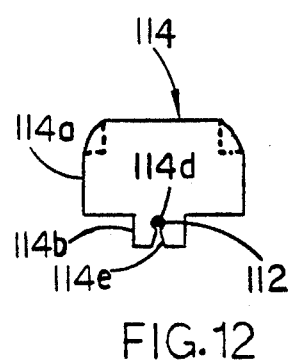
FIG. 12 is an end view of the emitter of FIG. 10.

As shown in FIGS. 10-12, emitters 114 have a conventional emitter body 114a. At opposite ends of body 114a are downwardly extending legs 114b and 114c. As shown particularly in FIG. 12, each leg, such as leg 114b, has an opening 114d that is sized to slidingly receive thread 112, but is too small to allow passage of a knot 116. A slot 114e allows the thread to be inserted into the opening.

Referring again to FIG. 9, an emitter-threading station 120, downstream from knotting apparatus 118, secures an emitter 114, received from a magazine 122, and forces the downstream end of the emitter, in this case the end having leg 114b, against the thread until the thread passes through slot 114e into opening 114d. As the thread is drawn to the left, as viewed in the figure, a knot 116 seats against the upstream side of leg 114b, and thereby applies the force from the thread to the emitter, carrying it downstream with the knot.

The emitter is carried to a detector station 124 similar in structure and function to detector 82 shown in FIG. 4, except that an emitter support 126 is also shown. Although such a support may also be used with detector 82, it is particularly important here since the emitter is free to rotate on the thread. In the emitter-threading installation of FIG. 9, only a single threading station is shown. In this case, then, the thread travel is stopped as each emitter reaches detector 124 to allow formation of a knot at knotting apparatus 118 and threading of the next emitter at threading station 120. Thread 112 having knots 116 is then used to draw emitters 114 into the conduit during formation of a drip line. Thread 112 can be continuous in the drip line like thread 58 described with reference to FIG. 1.

The structure of emitters 114 and the use of knots not fixedly attached to the emitters, allows an alternative form of the drip-line manufacturing process, as is illustrated in FIGS. 13 and 14. In these figures, a modified emitter support 130 extends through cross head 26 and into calibration and cooling trough 42, as does support 60 described with reference to FIGS. 1-3. Support 130, also referred to as a guide and as detaching means, has an internal groove 130a extending along both upper and lower surfaces and around a rounded distal end 130b.

A thread 132 is formed either as a continuous loop or as a single continuous thread like thread 58 shown in FIG. 1. Emitters 114 are attached at an emitter-threading station 120, as shown in FIG. 9. An emitter is carried by each knot 116 into a semimolten conduit 134. Support 130 extends sufficiently into the calibration and cooling trough so that an emitter that has been attached to the conduit draws the immediately subsequent emitters into the conduit. Alternatively, a thread driver 135, shown in out line, could be applied to the thread for pulling the thread around end 130b of the support and out of the conduit.

As illustrated in FIG. 13, as the thread is drawn around support end 130b, the thread is pulled out of opening 114d and slot 114e, thereby leaving the emitter attached to the conduit. The emitter rides on the upper edges of the support, so that the force of pulling the thread out of the opening does not pull the emitter away from the conduit. This embodiment attaches the emitters to the conduit by pulling them into it while supported on the support. However, instead of leaving the thread in the conduit, as is the case with the embodiment of FIG. 1, the thread is removed.

Figure 15:
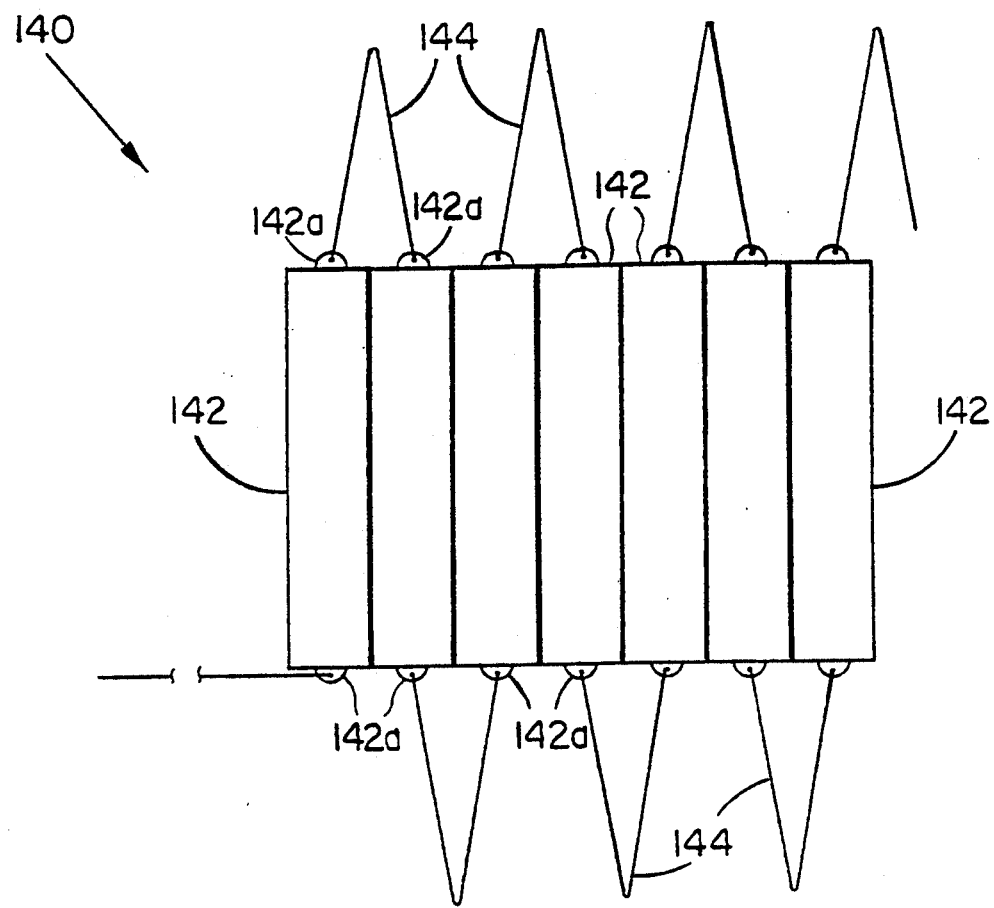
FIG. 15 is a top view of a set of adjacent emitters in side-to-side relationship and connected by fixed lengths of thread prior to insertion in an extruded conduit.
Figure 16:
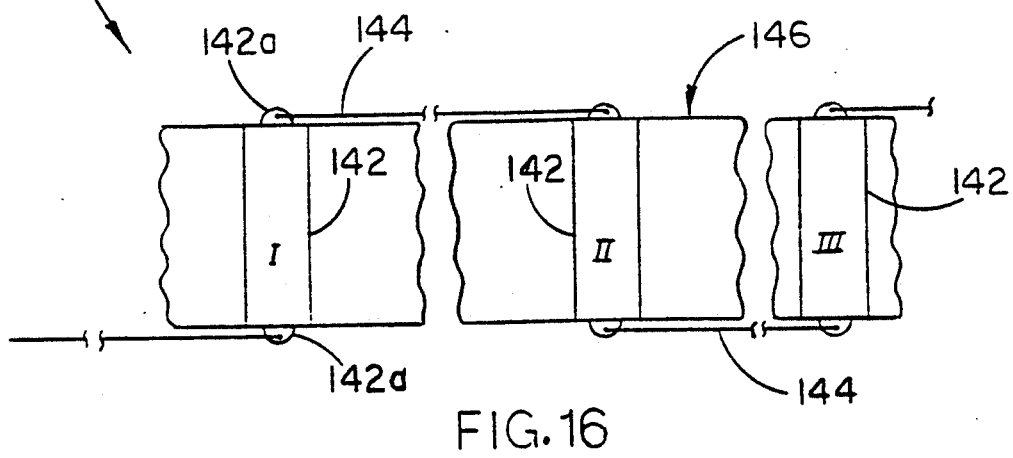
FIG. 16 is a view similar to that of FIG. 15 in which the emitters are spaced apart.

Yet another alternative emitter string 140 is illustrated in FIGS. 15 and 16. String 140 includes a plurality of emitters 142 connected together by individual threads 144. Each thread has a length corresponding to the desired spacing between the emitters in the drip line. Each emitter 142 has a tab 142a extending from each end. One thread end is then attached to the tab of a first emitter and the other end attached to a corresponding end of the next adjacent emitter, as shown. String 140 is then fed as a continuous string of emitters similar to continuous thread 58 shown in FIG. 1.

FIG. 15 shows an assembly arrangement in which emitters 142 are positioned in side-by-side arrangement to facilitate attaching the threads. FIG. 16 shows a slightly modified arrangement in which the emitters, carried on a common support 146, are still in side-by-side arrangement, but are spaced apart the length of the threads.

It will thus be apparent to one skilled in the art that variations in form and detail may be made in the preferred embodiment without varying from the spirit and scope of the invention as defined in the claims and in any modification of the claim language or meaning as provided under the doctrine of equivalents. The preferred embodiment is thus provided for purposes of explanation and illustration, but not limitation.

I claim:

1. A method for producing a drip irrigation line comprising the steps of:
   providing a first emitter;
   after the step of providing, attaching the first emitter to an elongate flexible element;
   continuously extruding an irrigation conduit from an extrusion head;
   drawing the conduit from the extrusion head;
   anchoring an end of the flexible element relative to the conduit, and thereby drawing the emitter into the conduit; and
   attaching the emitter drawn into the conduit to the conduit.

2. A method according to claim 1 wherein the emitter is releasably attached to the flexible element, the method further comprising the steps of detaching the flexible element from the emitter after the emitter is attached to the conduit, and removing at least the portion of the flexible element that was attached to the emitter from the conduit.

3. A method according to claim 2 further comprising drawing the flexible element around a guide extending into the conduit.

4. A method according to claim 1 further comprising the step of supporting the emitter in the conduit while the emitter is being attached to the conduit.

5. A method according to claim 1 wherein the flexible element is a thread and the step of attaching includes fixedly attaching a stop to the thread, and the emitter has an opening allowing movement of the thread but not allowing movement of a stop therethrough, and inserting the thread through the opening in advance of the stop.

6. A method according to claim 5 wherein the step of attaching a stop includes tying a knot in the thread as the stop.

7. A method according to claim 1 wherein the step of anchoring an end of the flexible element to the conduit comprises attaching a second emitter to a downstream position on the flexible element relative to the position of the first emitter and attaching the second emitter to the conduit in advance of the first emitter, whereby the drawing of the conduit with the second emitter attached draws the first emitter.

8. A method according to claim 1 further comprising the step of extending into the conduit as it is being extruded means for supporting the emitter during said step of attaching.

9. A method of producing a serial string of emitters for placement in a drip irrigation line comprising the steps of:
providing a plurality of previously made emitters; and
sequentially attaching the plurality of emitters serially along a continuous length of a flexible element at selected locations corresponding to the desired relative positions of the emitters in the drip line.

10. A method according to claim 9 wherein the flexible element is a thread and the step of attaching includes fixedly attaching stops to the thread at spacings corresponding to the spacings of the emitters along the thread, with each emitter having an opening allowing movement of the thread but not allowing movement of a stop therethrough, and inserting the thread in the opening of each emitter in advance of a respective stop.

11. A method according to claim 10 wherein the step of attaching stops includes tying a knot in the thread as the stop.

12. A method for producing a drip irrigation line having a plurality of spaced-apart emitter units, comprising the steps of:
providing a plurality of emitters;
after the step of providing, attaching the plurality of emitters serially along a continuous length of an elongate flexible element at spaced-apart locations to form a continuous string of emitters;
continuously extruding an irrigation conduit from an extrusion head;
drawing the conduit from the extrusion head;
anchoring a first of the emitters attached to an end of the flexible element relative to the conduit, whereby the string of emitters is drawn into the conduit as the conduit is drawn from the extrusion head; and
attaching each emitter on the string of emitters to the conduit as that emitter is drawn into the conduit.

13. A method according to claim 12 further comprising the step of supporting each emitter in the conduit while that emitter is being attached to the conduit.

14. A method according to claim 12 wherein the flexible element is a thread and each emitter is releasably attached to the thread, the method further comprising the steps of detaching the thread from each emitter after that emitter is attached to the conduit, and removing the detached thread from the conduit.

15. A method according to claim 14 further comprising drawing the thread around a guide extending into the conduit.

16. A method according to claim 12 wherein the step of attaching includes fixedly attaching stops to the thread at spacings corresponding to the spacings of the emitters along the thread, and each emitter has an opening allowing movement of the thread but not allowing movement of a stop therethrough, and inserting the thread through the opening of each emitter in advance of a respective stop.

17. A method according to claim 16 wherein the step of attaching stops includes tying a knot in the thread as the stop.

18. A method according to claim 12 wherein emitters are being attached to the flexible element while emitters previously attached to the same flexible element are being attached to the conduit.

19. An apparatus for producing a drip irrigation line comprising:
an elongate flexible element;
a first previously made emitter;
means for attaching the first emitter to the flexible element;
an extrusion head for continuously extruding an irrigation conduit sized to freely receive the flexible element;
means for drawing the conduit from the extrusion head; and
means for anchoring an end of the flexible element relative to the conduit, and thereby drawing the emitter into the conduit for attaching the emitter to the conduit.

20. An apparatus according to claim 19 wherein the flexible element is a thread and the means for attaching the emitter to the thread fixedly attaches a stop to the thread, and the emitter has an opening allowing movement of the thread but not allowing movement of a stop therethrough, and the means for attaching the emitter to the thread further inserts the thread in the opening in advance of the stop.

21. An apparatus according to claim 20 wherein the stop is a knot in the thread and the means for attaching the emitter to the thread ties the knot in the thread.

22. An apparatus according to claim 19 wherein the means for drawing the flexible element into the conduit comprises a second emitter attached to a downstream position of the flexible element relative to the position of the first emitter, and means for attaching the second emitter to the conduit in advance of the first emitter, whereby the drawing of the conduit with the second emitter attached draws the first emitter.

23. An apparatus according to claim 19 further comprising means extending into the conduit as it is being extruded for supporting the emitter relative to the conduit while the emitter is being attached.

24. An apparatus according to claim 23 wherein the emitter is releasably attached to the flexible element, the apparatus further comprising means for detaching the flexible element from the emitter after the emitter is attached to the conduit, and means for removing at least the portion of the flexible member that was attached to the emitter from the conduit.

25. An apparatus according to claim 24 wherein the detaching means comprises a guide extending into the conduit for defining a thread travel path.

26. An apparatus according to claim 19 further comprising means for supporting the emitter in the conduit while the emitter is being attached to the conduit.

27. An apparatus for producing a drip irrigation line having a plurality of spaced-apart emitters, comprising:
   a continuous length of a flexible element;
   a plurality of previously made emitters;
   means for attaching the previously made emitters serially to the flexible element at spaced-apart locations to form a string of emitters;
   an extrusion head for continuously extruding an irrigation conduit;
   means for drawing the conduit from the extrusion head; and
   means for attaching the emitters of the string of emitters sequentially to the conduit, whereby subsequent ones of the emitters are drawn into the conduit by the elongate element as the conduit is drawn from the extrusion head.

28. An apparatus according to claim 27 wherein the means for attaching the emitters to the conduit supports each emitter in contact with the conduit while that emitter is being attached to the conduit.

29. An apparatus according to claim 27 wherein the elongate element is a thread and the means for attaching the emitters to the thread releasably attaches each other to the thread, the apparatus further comprising means for detaching the thread from each emitter after that emitter is attached to the conduit, and means for removing the detached thread from the conduit.

30. An apparatus according to claim 29 wherein the detaching means comprises a guide extending into the conduit for defining a thread travel path.

31. An apparatus according to claim 29 wherein the thread has stops fixedly attached to it at spacings corresponding to the spacings of the emitters along the thread, and each emitter has an opening allowing movement of the thread but not allowing movement of a stop therethrough, and a slot allowing insertion and removal of the thread in the opening.

32. An apparatus according to claim 31 wherein the detaching means comprises a guide extending into the conduit for defining a thread travel path.

33. An apparatus according to claim 32 wherein the guide defines an arc along which the thread travels as it reverses direction in the conduit, the arc extending away from an emitter after the emitter is attached to the conduit, whereby the thread is removed from the emitter opening as it travels along the arc and the emitter is carried by the conduit.

34. An apparatus according to claim 27 wherein the flexible element is a thread and the means for attaching the emitters to the thread fixedly attaches stops to the thread at spacings corresponding to the spacings of the emitters along the thread, and each emitter has an opening allowing movement of the thread but not allowing movement of a stop therethrough, and a slot allowing insertion and removal of the thread in the opening, the means for attaching the emitters to the thread further inserts each emitter on the thread in advance of a stop.

35. An apparatus according to claim 34 wherein the means for attaching the emitters to the thread ties knots in the thread as the stops.

36. An apparatus according to claim 27 further comprising means for transporting the string of emitters from the means for attaching the emitters to the flexible element to the extrusion head for attaching emitters to the flexible element while other emitters, previously attached to the same flexible element, are being attached to the conduit.

* * * * *